No. 751,053. PATENTED FEB. 2, 1904.
T. BURROWS.
HAND TRUCK.
APPLICATION FILED OCT. 30, 1903.
NO MODEL.
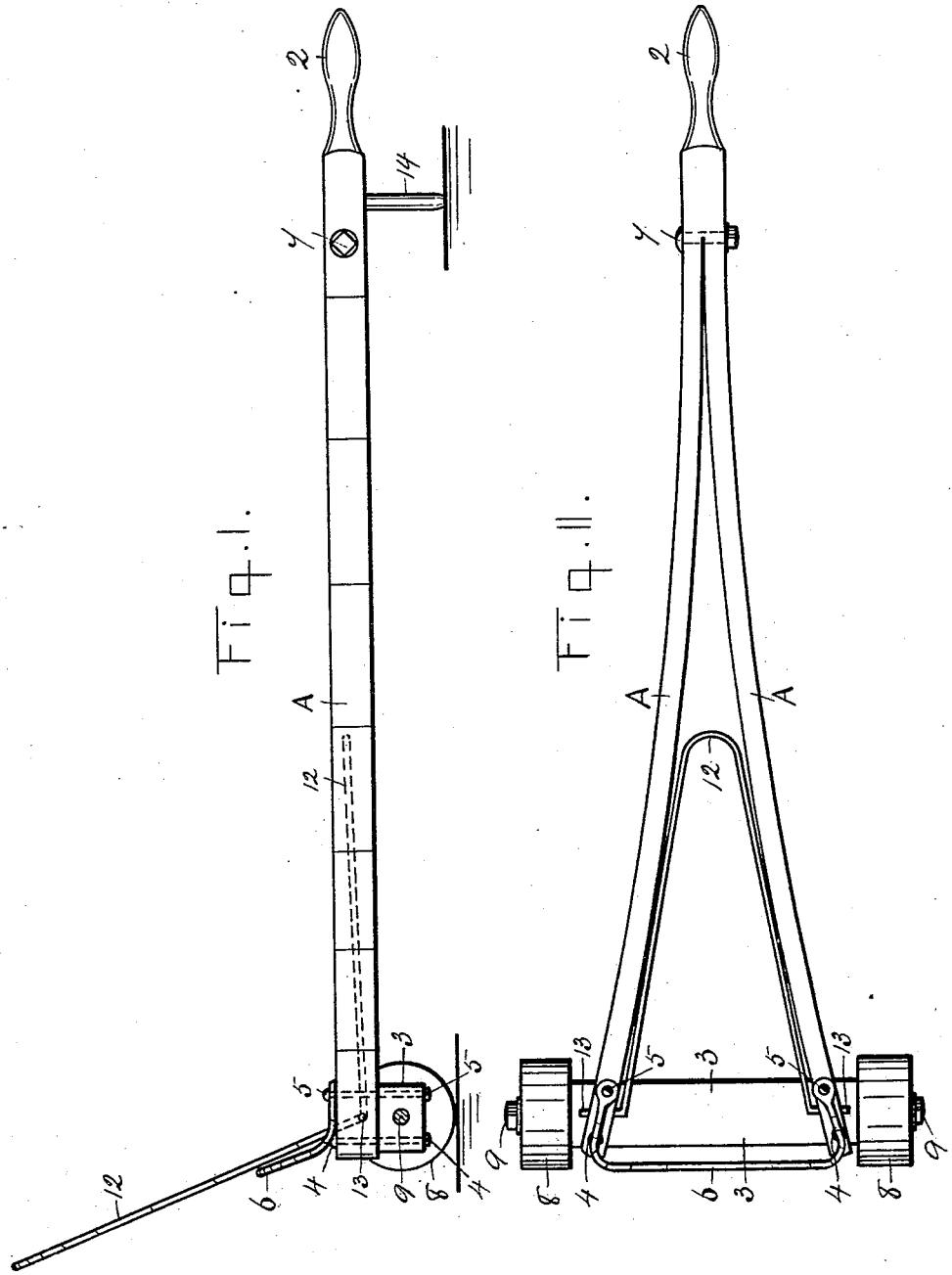
Witnesses.
Inventor:
Thomas Burrows No. 751,053. Patented February 2, 1904.

UNITED STATES PATENT OFFICE.

THOMAS BURROWS, OF HAMILTON, CANADA.

HAND-TRUCK.

SPECIFICATION forming part of Letters Patent No. 751,053, dated February 2, 1904.

Application filed October 30, 1903. Serial No. 179,198. (No model.)

*To all whom it may concern:*

Be it known that I, THOMAS BURROWS, a citizen of Canada, residing at Hamilton, in the county of Wentworth and Province of Ontario, Dominion of Canada, have invented new and useful Improvements in Hand-Trucks, of which the following is a specification.

My invention relates to improvements in hand-trucks consisting of a bifurcated frame of one piece having one handle and a transverse axle at the opposite end to said handle to carry two ground-wheels.

The objects of my invention are, first, to provide a bifurcated truck-frame of one piece with one handle forming a part thereof, and, second, to provide a bifurcated truck with an adjustable extension-stop at the wheel end thereof and means for retaining said extension-stop in operative and non-operative position. I attain these objects by the device illustrated in the accompanying drawings, in which—

Figure 1 is a side elevation of the truck, one ground-wheel of which is removed in order to show more fully the transverse axle-bar and the connection of the bifurcated frame therewith. Fig. 2 is a plan of the truck, showing the extension-stop adjusted to non-operative position.

Similar characters refer to similar parts throughout the several views.

In the drawings the bifurcated frame of the truck is indicated by A, with handle 2 at the closed end thereof and forming a part of the frame. The bifurcated ends of the frame extend in opposite directions and transversely with the handle 2 and are secured to the transverse axle-bar 3 by means of bolts 4 and 5. The bolts 5 also secure the stationary stop 6 to said frame, as shown in broken lines in Fig. 1 of the drawings.

The stop 6 in addition to the axle-bar 3 holds the bifurcated ends or branches of the frame A apart by means of said bolts. The handle end of the frame is held intact by means of the transverse bolt 7, which passes through the bifurcate of the frame.

8 represents the two ground-wheels supported on bolts 9, which are screwed into the ends of the axle-bar 3 and stationary therewith. The wheels 8 revolve on said bolts 9, a section of which is seen in Fig. 1 of the drawings.

12 is the extension-stop having two ends 13 bent transversely and extending through the end parts of the bifurcate A toward the ground-wheels and forming pivotal connection with said bifurcate frame. The opposite or high end part of the extension-stop 12 is curved or rounded, as required, and made of steel rod and so constructed with a tendency to extend outward toward the inner parts of the frame A by means of its own inherent resiliency in order that the same may retain its non-operative position, as shown in Fig. 2 of the drawings and in broken lines in Fig. 1 of the drawings. When the extension-stop 12 is in operative position, as shown in Fig. 1 of the drawings, the rigid stop 6 supports the extension-stop 12 in a most substantial manner from possibly falling over the front part of the truck.

The handle end of the truck is provided with a leg 14 to rest upon the ground and may be longer or not, as required.

The truck is capable of standing alone at most in vertical position on the rigid stop 6 and the wheels 8. It will be obvious that either one of the stops 6 and 12 may be used at pleasure, according to the bulk of the article or articles placed upon the truck.

It will be noticed in Fig. 1 of the drawings that the heads of the bolts 4 act as supports for the front part of the rigid stop 6, adding stability to said stop.

What I claim as my invention, and desire to secure by Letters Patent, is—

1. In a hand-truck, a bifurcated frame of one piece, and formed as a handle at the closed end thereof, a transverse axle secured to the under side of the opposite end of the frame, a rigid stop on the frame immediately over the axle-bar, an extension-stop pivoted to the frame above said axle and adapted to rest in position against the rigid stop, and to resume a non-operative position in the frame, ground-wheels at the ends of the axle-bar and means inserted in said ends to support said wheels, substantially as set forth.

2. In a hand-truck, a bifurcated frame of one piece, a handle formed at one end of the frame and the other end widened out, a rigid stop on the widened end of the frame, an axle-bar below said stop and frame, means for retaining said frame in rigid position, an extension-stop pivoted to the frame above the axle-bar to engage the upper part of said rigid stop, and adapted to resume and retain a non-operative position, ground-wheels at the ends of the axle-bar, and means to support said wheels, substantially as set forth.

THOMAS BURROWS.

Witnesses:
 JOHN H. HENDRY,
 E. J. MILLS.